(12) United States Patent
Knestel

(10) Patent No.: US 6,336,079 B1
(45) Date of Patent: Jan. 1, 2002

(54) PROCESS AND DEVICE FOR CONTROLLING A TEST TRACK SYSTEM FOR MOTOR VEHICLES

(75) Inventor: Anton Knestel, Hopferbach (DE)

(73) Assignee: Maha Maschinenbau Haldenwang GmbH & Co. KG, Haldenwang (DE)

( * ) Notice: Subject to any disclaimer, the term of this patent is extended or adjusted under 35 U.S.C. 154(b) by 0 days.

(21) Appl. No.: 09/171,116

(22) PCT Filed: Apr. 14, 1997

(86) PCT No.: PCT/EP97/01868

§ 371 Date: Oct. 13, 1998

§ 102(e) Date: Oct. 13, 1998

(87) PCT Pub. No.: WO97/39324

PCT Pub. Date: Oct. 23, 1997

(30) Foreign Application Priority Data

Apr. 16, 1996 (DE) .................................. 196 15 008

(51) Int. Cl.⁷ .................... G06F 15/74; G01M 17/00
(52) U.S. Cl. ................ 702/123; 702/183; 701/29; 701/32; 701/35; 701/99
(58) Field of Search .................. 702/123, 183, 702/188, 184; 73/117.2, 117.3; 705/400, 1, 16, 24, 29, 20; 701/29, 99, 32, 35

(56) References Cited

U.S. PATENT DOCUMENTS 4,922,443 A * 5/1990 Coetsier et al. ............. 702/188
5,557,268 A * 9/1996 Hughes et al. ................ 701/32
5,657,233 A * 8/1997 Cherrington et al. ....... 705/400
5,717,595 A * 2/1998 Cherrington et al. ...... 73/117.2

FOREIGN PATENT DOCUMENTS

| DE | 38 74 464 | 3/1989 | ........... G01M/17/00 |
| EP | 306362 | 3/1989 | ........... G01M/17/00 |
| EP | 602920 | 6/1994 | ........... G01M/17/00 |
| EP | 709755 | 5/1996 | ........... G05B/19/00 |

* cited by examiner

*Primary Examiner*—Marc S. Hoff
*Assistant Examiner*—Hien Vo
(74) *Attorney, Agent, or Firm*—The Maxham Firm

(57) ABSTRACT

A method and apparatus for controlling a test track system for motor vehicles having at least one test station and a device for carrying out this method (European system), which allows a high utilization of the capacity of the test track system. This can be accomplished, for example, by the fact that the system can automatically make an unambiguous identification of the vehicle and an unambiguous identification of the tester at each testing section. Thus all the information compiled by the test stations is automatically allocated to the current vehicle being tested. This makes it possible for the tester to move the vehicle from one test road to another, for example, without having to initialize the system again at the new test road. The system recognizes automatically that the vehicle is being tested further in the second test road, for example.

13 Claims, 12 Drawing Sheets

```
          <Fn> KEYS OR ENTER DATA
        [<F5> DELETE VEHICLE]  [<F6> UPDATE VEHICLE]

VEHICLE
       MANUFACTURER
           MODEL
           MODEL
       KEY NO. 123
        DATE FROM:
          DATE TO:

[<F2> LOAD VEHICLE]    [<F4> SAVE]
```

FIG. 8

```
         <Fn>-KEYS FOR (OTHER)

MEASUREMENTS

[<F2> DISPLAY PASSENGER VEHICLE MEASUREMENT]
    [<F3> DISPLAY TRUCK MEASUREMENT]
    [<F4> NEW VEHICLE]
    [<F5> LOAD PASSENGER VEHICLE MEASUREMENT]
    [<F6> LOAD TRUCK MEASUREMENT]
```

FIG. 9

```
         SELECT VEHICLE MANUALLY
TESTER:
        ┌─────────────────────────────────────┐
        │         EXHAUST/DEFECTS             │
        │  ┌───────────────────────────────┐  │
        │  │  <F2> SELECT VEHICLE          │  │
        │  ├───────────────────────────────┤  │
        │  │  <F3> VISUAL DEFECTS          │  │
        │  ├───────────────────────────────┤  │
        │  │  <F4> MEASUREMENTS            │  │
        │  ├───────────────────────────────┤  │
        │  │  <F5> END MEASUREMENT AND SAVE│  │
        │  ├───────────────────────────────┤  │
        │  │  <F6> ONLY SAVE MEASUREMENT   │  │
        │  ├───────────────────────────────┤  │
        │  │  <F10> OTHER                  │  │
        │  └───────────────────────────────┘  │
        │  END OF PROGRAM  <F1> HELP  <F12> PRINT │
        │                                     │
VEHICLE:
```

FIG. 10

```
   ASSIGN VEHICLE VIA TRANSPONDER,
          SELECT MANUALLY
TESTER: WERN:
        ┌─────────────────────────────────────┐
        │         EXHAUST/DEFECTS             │
        │  ┌───────────────────────────────┐  │
        │  │  <F2> SELECT VEHICLE          │  │
        │  ├───────────────────────────────┤  │
        │  │  <F3> VISUAL DEFECTS          │  │
        │  ├───────────────────────────────┤  │
        │  │  <F4> MEASUREMENTS            │  │
        │  ├───────────────────────────────┤  │
        │  │  <F5> END MEASUREMENT AND SAVE│  │
        │  ├───────────────────────────────┤  │
        │  │  <F6> ONLY SAVE MEASUREMENT   │  │
        │  ├───────────────────────────────┤  │
        │  │  <F10> OTHER                  │  │
        │  └───────────────────────────────┘  │
        │  END OF PROGRAM  <F1> HELP  <F12> PRINT │
VEHICLE:              KE-X 564
```

FIG. 11

```
<Fn> KEYS FOR (OTHER)

MEASUREMENTS
    <F2> DISPLAY MEASUREMENT
    <F3> FREE
    <F4> NEW VEHICLE
    <F5> LOAD MEASUREMENTS
    <F10> FREE
```

FIG. 14

```
        SELECT TEST STAND FOR REDISPLAY

IDENTIFIER:    TEST DATE:    CUSTOMER'S NAME:

<F1> BRAKE VA   <F5> SHOCK ABSORBER VA   <F10> EXHAUST
   <F2> BRAKE FB   <F6> SHOCK ABSORBER HA   <F11> OPACITY
   <F3> BRAKE HA   <F7> WHEELS              <L> LIGHT
   <F4> BRAKE EAW  <F8> TACHOMETER          <M> DEFECT
                   <F9> DISTANCE

<F12> COMPLETE PRINTOUT
```

FIG. 15

PROCESS AND DEVICE FOR CONTROLLING A TEST TRACK SYSTEM FOR MOTOR VEHICLES

BACKGROUND

1. Field of the Invention

The present invention concerns a method and a device for controlling a test system for motor vehicles (European system).

2. Discussion of Related Art

According to the related art, there are known test tracks which combine the operating elements and functions over a communications console. All values determined by the individual testing devices are processed and evaluated in a central unit.

However, such a system has the disadvantage that when changing from one test track to another, a tester conducting a test of a motor vehicle must re-enter the specific vehicle information into the control system of this new test track in order to perform the test.

Especially with large test track installations, it may be important for the tester to be able to move the vehicle from a first test road to another to perform the outstanding tests in the second test road. This is important especially when a section of the first test road is blocked but the section of the second test road with the same test function is ready for use.

SUMMARY OF THE INVENTION

It is a primary purpose of this invention to create a method of controlling a test system for motor vehicles having at least one test road and a device for carrying out this method that will permit rapid and automated testing of motor vehicles with a high flexibility while guaranteeing a high utilization of available capacity.

According to this invention, an unambiguous and current identification number is generated by the system for each motor vehicle to be tested. This identification number may be a serial number. After generating this identification number, a test data record with the identification number as the identifier is generated, with this test data record having a predetermined number of data fields. The test data record is loaded onto a workstation of the system, and a test cycle of a test station is performed. With this test cycle, measured data are acquired and transferred to a workstation. The data fields of the test data record are then filled selectively with the received measured data. Then the contents of the data fields of the test data record can be output to an output device. The output device may be a printer or a display screen, or both.

The test cycles of the test stations of the invention can be controlled by a control module which is provided for the respective test station. These control modules may be connected by a field bus to a control node which is in a workstation. Data can be transmitted between the individual control modules and the control node by electrical, optical or electromagnetic means.

There may be numerous workstations which are networked with a LAN (local area network). These workstations may be clients connected to a server. However, this LAN structure is only one example. It is also conceivable to use workstations which serve only as terminals, with these terminals being connected to a central computer.

The workstations may be distributed so that one workstation is set up in an office area and another workstation is located at the test road. If numerous sections are provided for this test road, one workstation may be provided for each section.

The workstations of the test road may be connected to a field bus which is also connected to control modules. These control modules are programmable electronic units which can perform a test cycle of the respective testing instrument and can also hold the necessary measured values. These measured values are then transmitted via the field bus to the control node in the respective workstation. These measured data can then be stored and administered on a central computer (server), for example.

In addition, a card reader may be arranged on the workstation located in the office area. This card reader may be used to store the identification number of the current testing operation on a card. This card can then be inserted into a second card reader located at a first workstation of the test road. This makes it possible to read the identification number of this card and transmit it to the respective workstation. As will be explained in greater detail below, reading the card serves to initialize the testing procedure in that the workstation is informed of which vehicle is ready for testing. Using the identification number, the necessary vehicle information can be loaded onto the workstation to perform a suitably adapted test.

In addition, a transponder system may also be provided, consisting of a transponder element and a transmitter/receiver. The transponder element may be assigned to a certain tester, in which case the tester moving the vehicle through the test road will be recognized at each test section, thus permitting an unambiguous assignment of the vehicle to the measurements performed. Therefore, a vehicle can be moved by a tester from one test road to another without requiring a new identification of the vehicle, because a section 2 of test road 2 recognizes by means of the transmitter/receiver of the respective transponder system which vehicle is ready for testing and then enters the measured data into the test data record of this vehicle.

In addition, a device is provided according to this invention for controlling a test track system, optionally consisting of multiple workstations, for motor vehicles. These multiple workstations may be connected by a LAN to a local area network server which is capable of supplying the required information for the workstations and loading the test data record onto the workstations.

According to this invention, a modular and thus expandable vehicle testing system is created, permitting optimal utilization of all test sections. In addition, this guarantees that vehicles or testers, or both, can be identified automatically online, so that the testing operations are optimized with regard to time in the best possible way, because no additional time is required on the part of the tester for vehicle identification or setting the test instruments for the specific type of vehicle.

Using the card and transponder minimizes the incidence of errors in all information relevant to the vehicles, because the tester need no longer enter the vehicle identification into the system at each section. In addition, the test system according to this invention permits better utilization of work time and test stands with improved vehicle throughput.

BRIEF DESCRIPTION OF THE DRAWING

The objects, advantages and features of the invention will be more readily perceived from the following detailed description, when read in conjunction with the accompanying drawing, in which:

FIG. 8 shows a vehicle administration display screen;

FIG. 9 shows a measurement display screen in the office area;

FIG. 10 shows a start display screen in test section I without transfer of the tester's name and identification;

FIG. 11 shows a start display screen for test section I with transfer of the tester's name identification;

FIG. 14 is a measurement display screen;

FIG. 15 shows a display screen subordinate to the display screen shown in FIG. 14, if function key 2 has been selected;

DETAILED DESCRIPTION OF THE PREFERRED EMBODIMENTS

Figure 1:
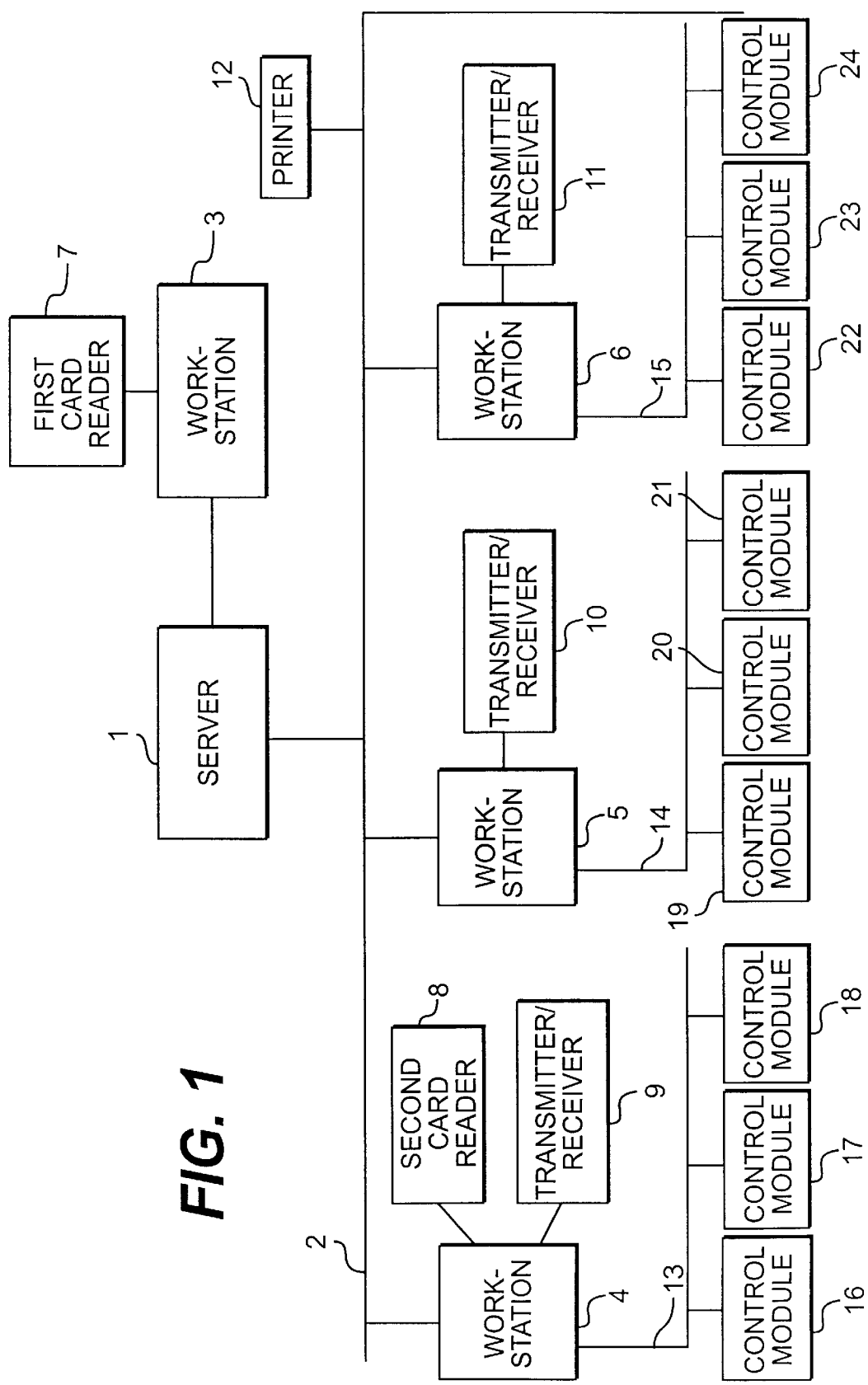
FIG. 1 is a block diagram of one embodiment of the test track system according to this invention.

With reference now to the drawing, and more particularly to FIG. 1, there is shown an example of a test track system showing only one test road. The test system according to this invention has server 1 connected to a plurality of workstations 3–6 via a local area network (LAN) 2. Server 1 and workstation 3 are preferably set up in an office area of the test track system. A first card reader 7 is connected to workstation 3.

Workstations 4–6 are set up along the test road, with workstation 4 being arranged in test section I, workstation 5 in test section 11 and workstation 6 in test section II. A second card reader 8 and transmitter/receiver 9 of a transponder system are connected to workstation 4. Transmitter/receiver 10 of the transponder system is connected to workstation 5, and transmitter/receiver 11 of the transponder system is connected to workstation 6. In addition, printer 12 which serves as an output device is connected to local area network 2.

Workstations 3–6 may have keyboards (not shown) as input devices and display screens (not shown) as output devices. Furthermore, additional printers (not shown) may be connected locally to the respective workstations 3–6 or to the local area network 2, or both.

A field bus 13–15 is connected to workstations 4–6 by the respective control nodes (not shown). Control modules 16–24 connected to field buses 13–15 control the corresponding test stations (not shown).

Test section I (workstation 4) may include as test stations a headlight adjusting device, a brake fluid tester, a diesel exhaust test and a gasoline exhaust test, for example. Thus, control module 16 would be provided for the headlight adjusting device, control module 17 for the brake fluid tester and control module 18 for the exhaust gas test. The control modules are designed so that they are capable of controlling the test cycle completely. In addition, it is possible to modify the respective test cycle performed by control module 16–18 over field bus 13 and transmit the measured values thus detected to workstation 4. The preceding discussion also applies similarly to workstations 5 and 6, field buses 14 and 15 and control modules 19–24.

In addition, it should be pointed out here that only one test road is shown in FIG. 1 as an example. The second test road would be connected at the bottom of FIG. 1 and would be connected to the server 1 by extending local area network 2 downward. Additional workstations, each having field buses with control modules, may also be provided in test road two (not shown).

Data may be transmitted over the field bus electrically over a twisted pair cable, optically over an optical fiber or electromagnetically. The same thing is true of local area network 2.

Workstations 4–6 also each have switch modules which supply the test stands with electric power over electric switching systems.

Control modules 16–24 are programmable electronic units which can automatically calibrate the testing equipment. Field buses 13–15 may also be formed by a LON (local operating network). For example, a wheel tester, a tachometer test stand, a shock absorber test stand and a brake test stand may be connected to workstation 5, which belongs to test section II. Control module 19 may be connected to the wheel tester, control module 20 to the tachometer test stand and control module 21 to the shock absorber test stand.

Workstation 6 is assigned to test section III and can be used for input of visual defects by the tester. Visual defects in the vehicle can be entered by the tester via an input medium (not shown) such as a touch screen display or a keyboard (see FIGS. 12 and 13).

Control modules 22–24 assigned to workstation 6 in FIG. 1 are shown additionally only as an example, but it should be pointed out that they are not necessary for visual defect input.

Before discussing details of the schematic flow charts in FIGS. 2 through 5, the basic design of the databases generated by the system according to this invention should be described first. An administrative database containing an identification number assigned to the current testing procedure is created with a higher priority than the database system thus generated. In addition, the administrative database contains a number identifying the vehicle model plus the name and address of the owner. The administrative database thus has a relational connection to a vehicle model database through the number identifying the vehicle model. The administrative database also has a relational connection to testing device databases generated on the basis of the identification number, which is also included in parallel in each testing device data record.

In addition, a system database is provided, containing nation-specific limit values and customer-specific settings. In addition, a tester database is provided, containing the name of the tester and an allocation to a certain transponder element.

The vehicle model database contains vehicle-specific data which can be loaded, for example, over the field bus to the respective control modules to perform a specific test procedure.

The testing device databases are designed so that a brake test stand database is generated for the brake test stand and a shock absorber test stand database is generated for the shock absorber test stand. Access to the testing instrument databases is gained, as mentioned above, on the basis of the identification number from the administrative database.

Figure 2:
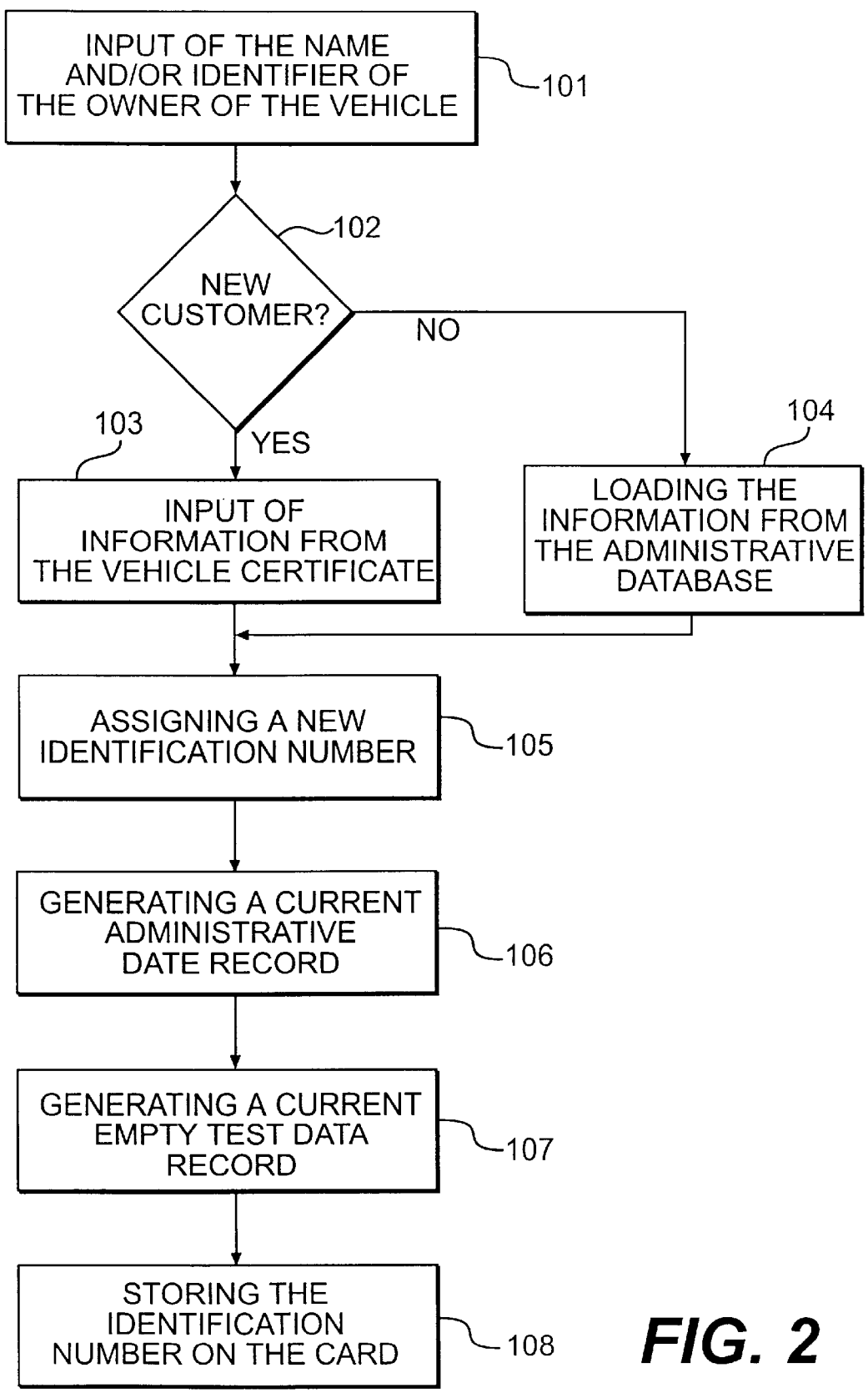
FIG. 2 is a flow chart of processing in an office area.

FIG. 2 shows a systematic flow chart, which is followed, for example, at workstation 3 in the office area. In step 101, the name of the vehicle's owner or the license plate number of the vehicle, or both, is entered on a keyboard when a customer has a vehicle tested. Then, by inquiry to the administrative database in step 102, the system determines whether or not this is a new customer. If step 102 shows this to be a new customer, data input is requested in step 103. Data entered might include, for example, information from the vehicle registration for the vehicle to be tested. This information is then recorded after being entered into the administrative database. If the query in step 102 is answered as NO, the information already available from the administrative database is loaded in step 104. Next a new identification number is assigned to the current vehicle testing procedure in step 105. In step 106, a current administrative data record would be generated, containing the new identification number, among other things. Then a new empty test data record is generated in step 107, whereupon the identification number is stored on a card (step 108).

Of course, other information may also be stored on the card. It is also conceivable for the card to form an electronic vehicle registration, for example, on which all the necessary information would then be stored.

After the necessary information has been generated by the system and a current new identification number has been issued for this testing procedure, the actual procedure can be initiated.

After saving the identification number on the card in the office section, and after the tester receives the card, he can insert it into the second card reader 8 of test section I.

Figure 3:
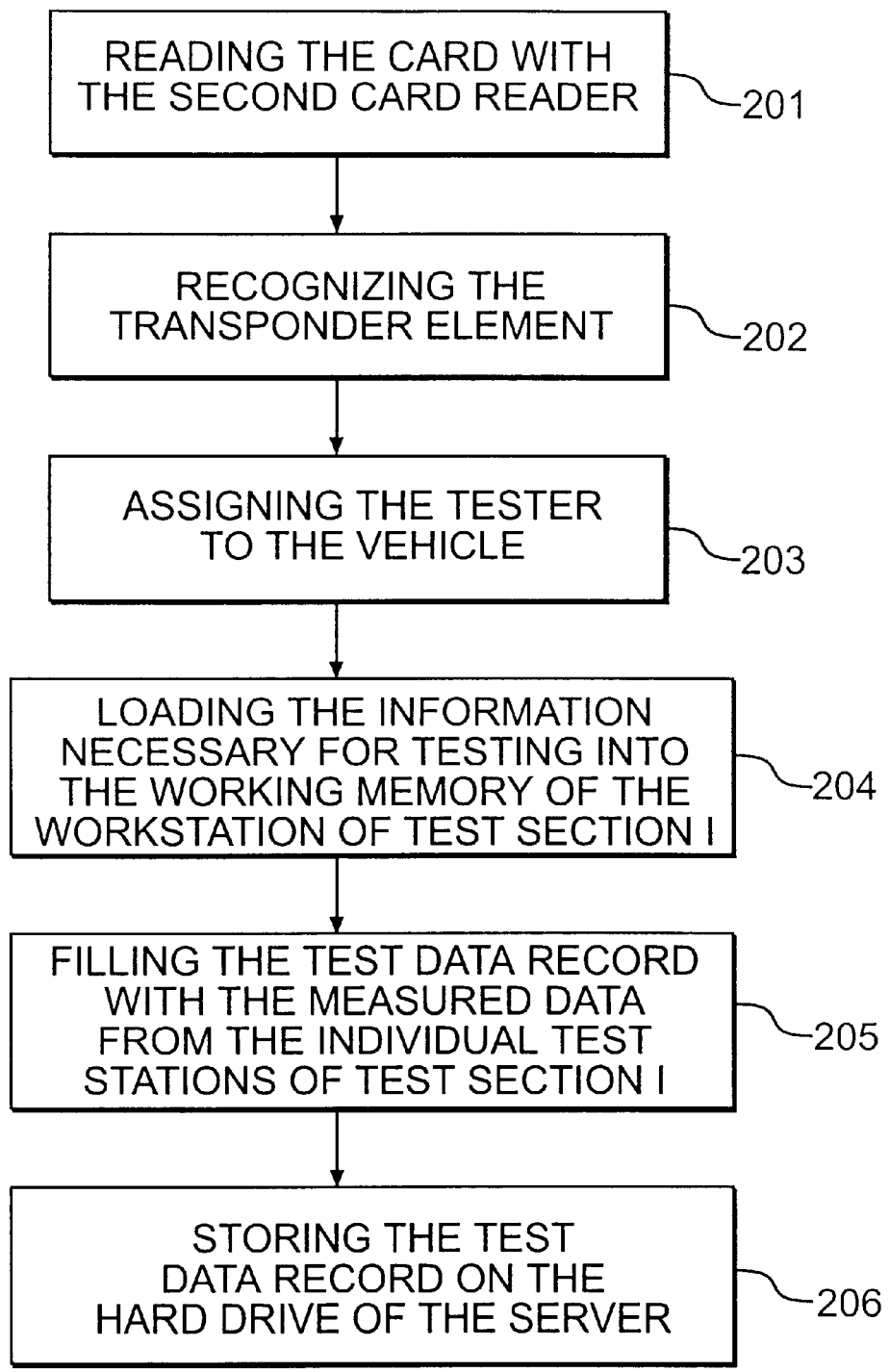
FIG. 3 is a flow chart of processing in a test section I.

As shown in FIG. 3, the identification number is read from the card in step 201. Then in step 203, a transmitter/receiver of the transponder system 9 which is connected to workstation 4 of test section I recognizes that a certain tester is now testing the vehicle.

The tester database holds the name of the tester, for example, as described above, and a certain transponder element is assigned to this tester. The transmitter/receiver of the transponder system can then identify each individual transponder element, so that a tester carrying his own specific transponder element can be recognized by the system. Of course, other testers may also be assigned to the respective transponders (see FIG. 18).

The procedure described above may take place simply by having the transmitter/receiver of the transponder system arranged close to the keyboard of workstation 4 of test section I. When the tester inserts the current card into the second card reader 8, the transmitter/receiver of the transponder system automatically also recognizes the tester assigned to the current testing procedure, so that an unambiguous relationship has been established between the vehicle to be tested (on the basis of the identification number) and the tester.

After the transponder element has been recognized in step 202, as mentioned briefly above, the tester is assigned to the vehicle in step 203. Then in step 204, the test data record and all the information required for testing is loaded into the memory of workstation 4 of test section I. This memory is RAM, for example. The information required for testing includes, in particular, the test data record which is now filled with test data in step 205. The test data is transmitted from the test stations to workstation 4 over the respective control modules 16–18. The transmission medium here is field bus 13. Of course, the information loaded in step 204 and needed for testing could also include control information for the test stations. This control information could then be transmitted over field bus 13 to the respective control modules 16–18 to transmit vehicle-specific information, for example.

After the tester has gone through all the test stations, data acquisition is concluded and the test data and test data record can be stored on the hard drive of server 1. The test data may be stored in the test databases together with the identification number.

After going through test section I, the tester can then move the vehicle to test section II (workstation 5). This test section II may be located in the same test road or in another test road, for example, if test section II of the current test road is either occupied or blocked. The tester would then drive the vehicle to the wheel tester, for example. The control module therefore recognizes by means of a suitable sensor input that a vehicle is ready for testing and it notifies workstation 5 over field bus 14 that new measured data are now pending. The control module will then automatically perform a wheel test on the basis of the program stored in the control module and then transmit the information over the field bus to the working memory of workstation 5.

Figure 4:
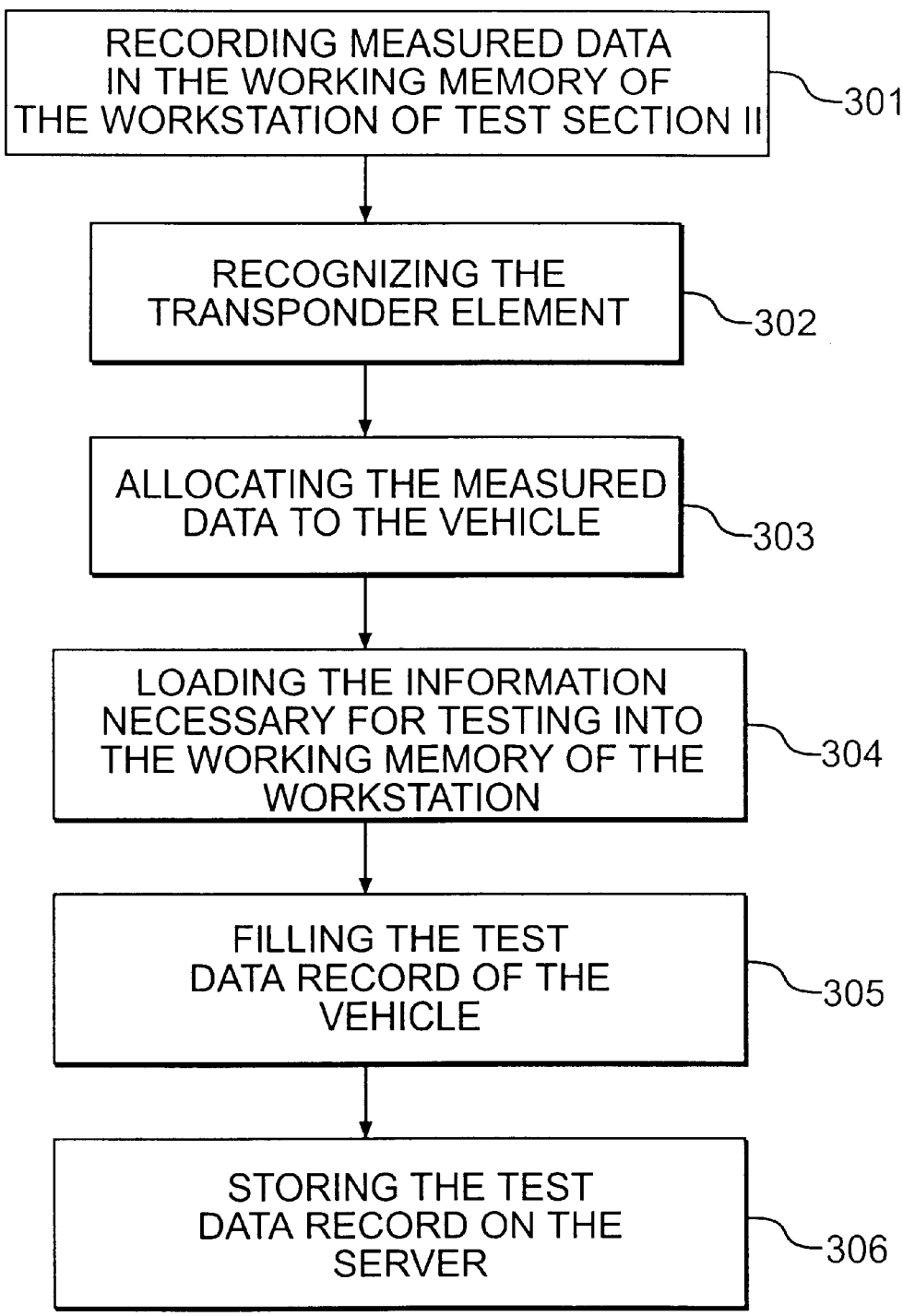
FIG. 4 is a flow chart of processing in a test section II.

This procedure is illustrated in FIG. 4, which is assigned to test section II. In step 301, the measured data are transmitted to the working memory of workstation 5 during the measurement procedure (as described above). In step 302, after all the measurements in test section II are completed, that is, at the end of test section II, transmitter/receiver 10 recognizes the transponder element of the respective tester. Therefore, in step 303, the measured data are assigned to the tester and thus to the vehicle. Next, in step 304, all the information required to fill out the test data record is loaded onto workstation 5, and the test data record is filled with the vehicle's test data in step 305. Then the test data is saved to the server in step 306.

Figure 5:
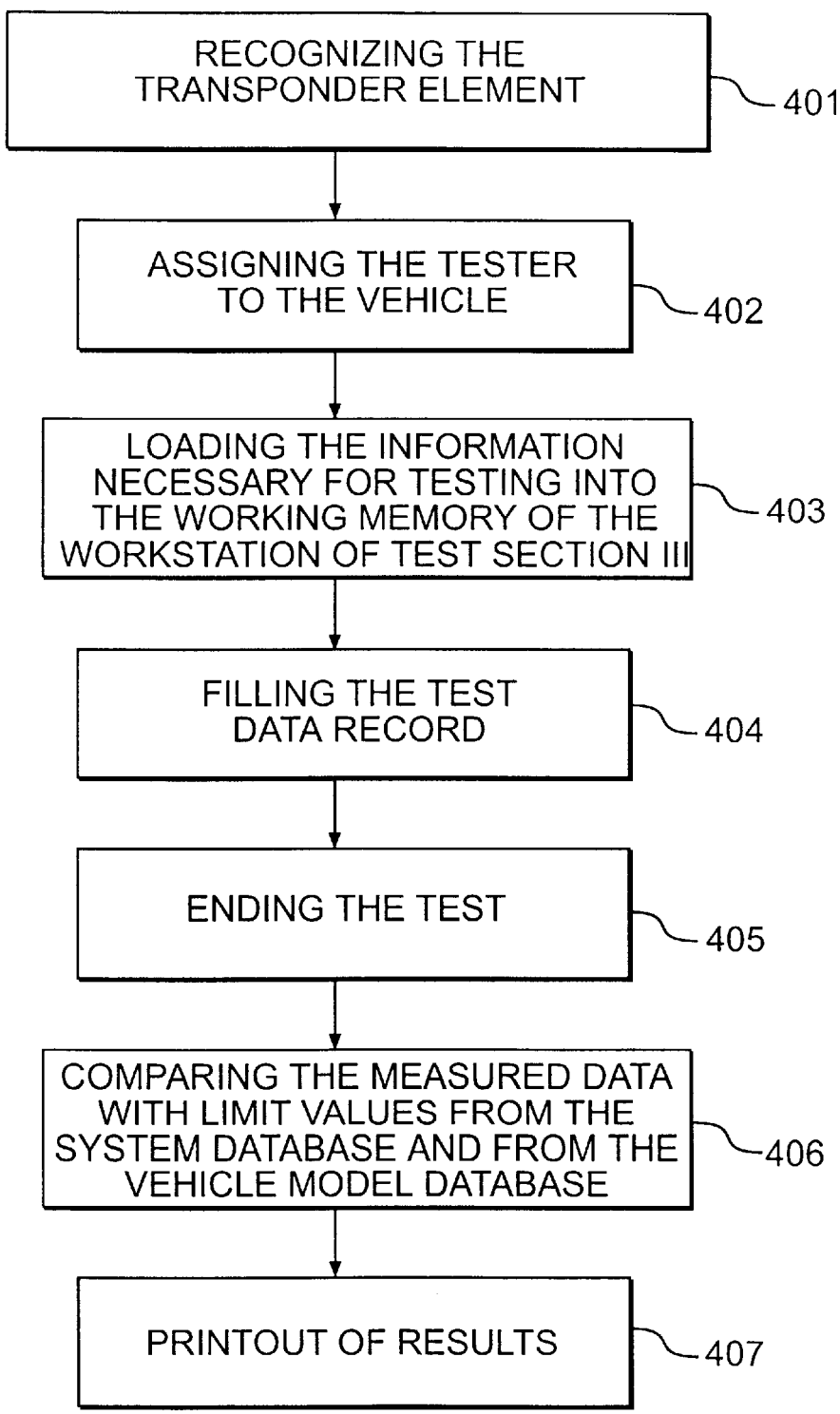
FIG. 5 is a flow chart of processing in a test section III.

FIG. 5 shows a flow chart which is run through in test section III, for example. In test section III, the corresponding transmitter/receiver of the transponder system is arranged at the beginning of the section. Thus, when the tester moves the vehicle to test section III, the vehicle is recognized on the basis of the tester's transponder element (steps 401 and 402). Then in step 403, the information required for the test is loaded onto the working memory of workstation 6. Data loaded into the working memory may also contain all the measured values from measurements performed previously in sections already run through. Then in step 404, the loaded test data record is filled with measured values (in this case, for example, the vehicle's defects entered previously by the tester on the basis of a visual defects entry). After conclusion of the visual inspection, the tester concludes the test in step 405, whereupon in step 406 the measured data with the present identification number is compared with limit values from the system database and from the vehicle model database. Then the results can be printed out in step 407.

In principle, all the measured values performed by then can be loaded onto any workstation.

It should be pointed out here that the transponder element may of course also be arranged on the vehicle so that the vehicle is not recognized on the basis of the tester but instead is recognized directly on the basis of the vehicle.

Figures 6, 7:
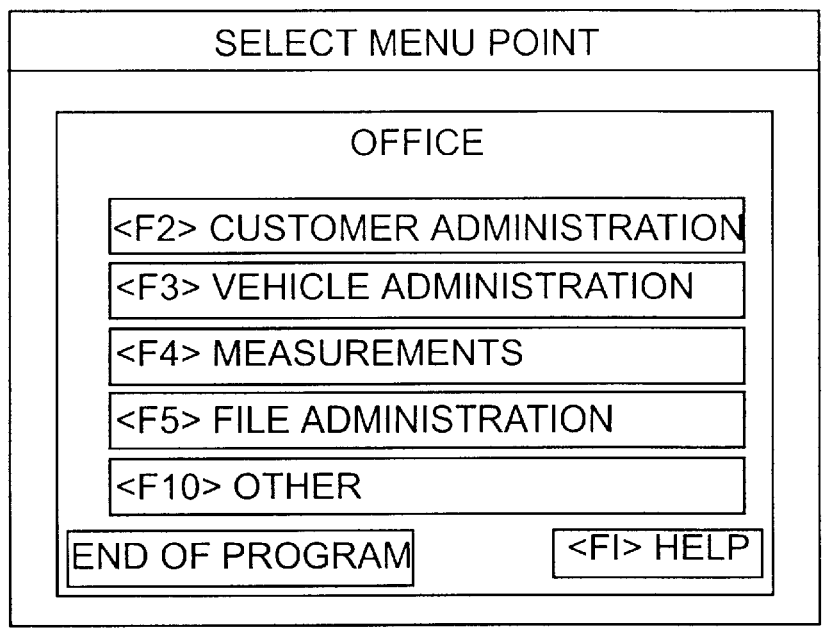
FIG. 6 shows an office start display screen.
FIG. 7 shows a customer administration display screen.

FIG. 6 shows the starting screen as displayed on the display screen at workstation 3. Workstation 3 is in the office area of the test system according to this invention. By operating function keys (F2, F3, F4, F5 and F10), the user can select various system options.

FIG. 7 shows a screen displayed by the system when function key F2 is operated. As shown here, the name of the owner of the vehicle, the vehicle license plate, etc., may now be entered. This information is stored in the administrative database. If the customer's information is already known in the system, that is, if the information is already stored in the administrative database, it is sufficient to enter just the vehicle license plate, for example, to fill the screen shown in FIG. 7 with the proper information from the administrative database.

FIG. 8 shows the screen displayed in the office area when function key F3 of the start screen shown in FIG. 6 is depressed.

FIG. 9 shows the screen displayed when function key F4 of the start screen from FIG. 6 is depressed.

FIG. 10 shows a start screen such as that displayed at workstation 4 of test section I before the card programmed accordingly in the office section has been inserted by the tester into the second card reader 8 of workstation 4. In other words, the screen shown in FIG. 10 does not show a tester's name or an automobile license plate.

FIG. 11 shows the status of the system after the tester has inserted the card into the card reader and after the transmitter/receiver of the transponder system assigned to workstation 4 has recognized the transponder element of the respective tester. In FIG. 11 the fields for the tester and the vehicle identification number are filled appropriately. The test can thus be begun, and the measured data assigned to the vehicle can be entered in the corresponding test data record.

Figure 12:
FIG. 12 is an input display screen for visual defects.

FIG. 12 shows a display screen such as that which would be displayed at workstation 6, for example. Workstation 6 is provided in test section III, where visual defects are entered. As shown in FIG. 12, the tester can then perform various tests and make appropriate choices by simply touching the fields for selection, if the screen assigned to workstation 6 is a touch screen.

Figure 13:
FIG. 13 is a display screen subordinate to the display screen shown in FIG. 12.

FIG. 13 shows a submenu of FIG. 12 if field "A" has been selected in the FIG. 12 display. As shown in FIG. 13, appropriate tests can now be performed and entered. All selection fields shown in FIG. 13 may in turn contain submenus (not shown here).

Figure 16:
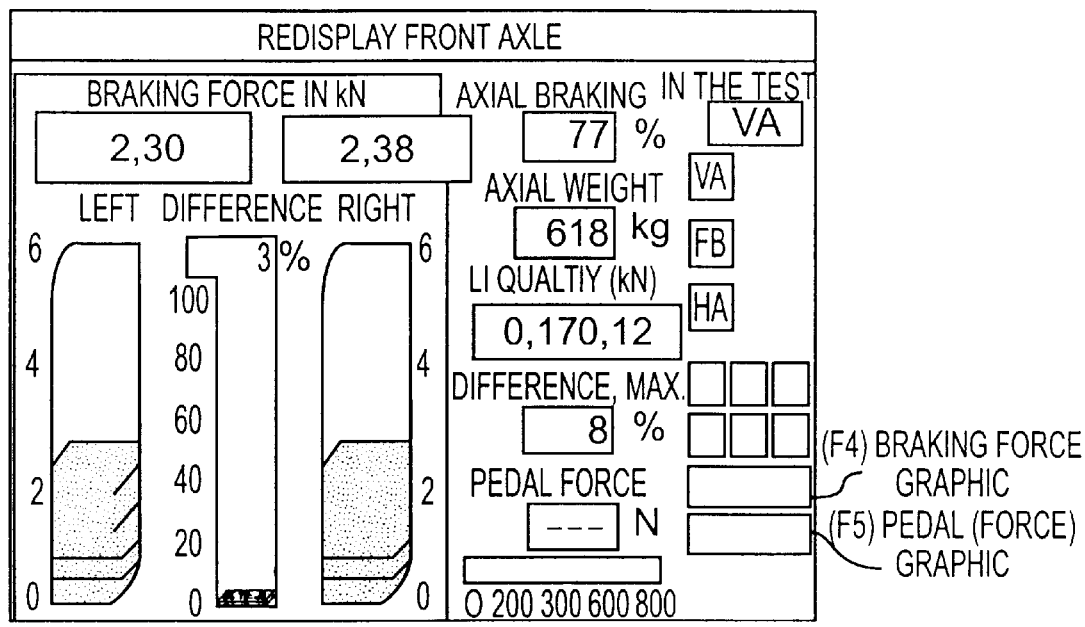
FIG. 16 shows a display screen subordinate to the display screen shown in FIG. 15, if function key 1 has been selected.

FIG. 14 shows a screen which is displayed on a display screen at workstation 4–6 when function key F4, shown in FIGS. 10 and 11, is operated. Measurements can be displayed (FIG. 15) by operating function key F2 when the screen shown in FIG. 14 is displayed. Then when function key F11 is operated with a screen displayed as shown in FIG. 15, a screen according to FIG. 16 is shown.

Figure 17:
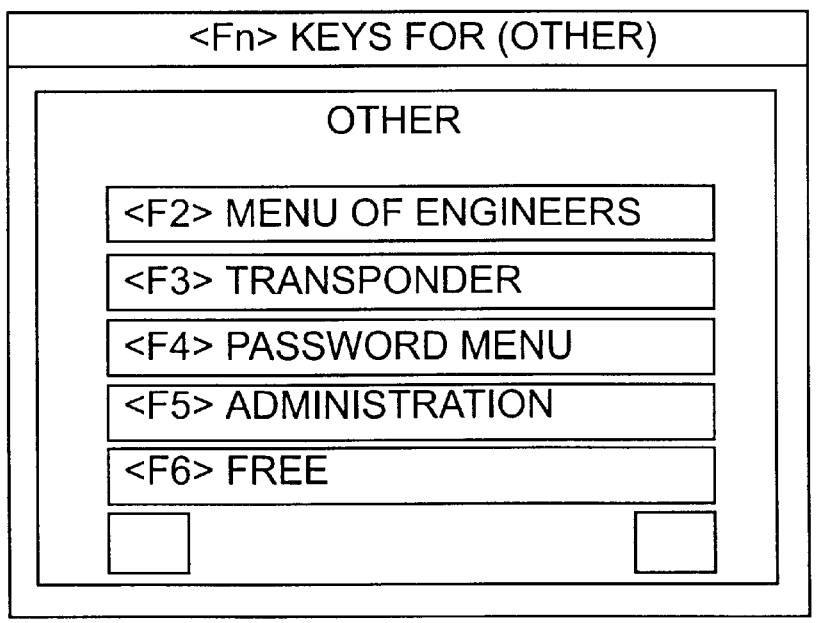
FIG. 17 shows a display screen generated by operation of function key 10 in FIG. 10.
Figure 18:
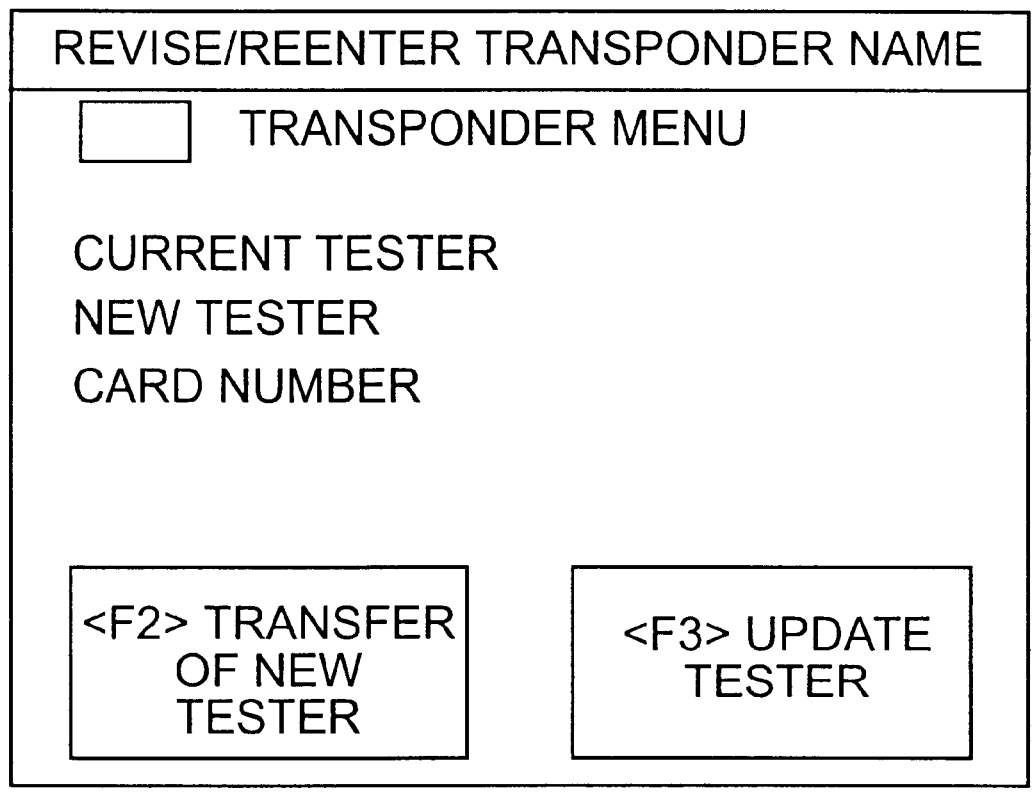
FIG. 18 shows a display screen generated when function key 3 is operated with the display screen illustrated in FIG. 17.

FIG. 17 shows a screen which is obtained by depressing function key F10 of the start screen for the test road (FIGS. 10 and 11). If function key F3, for example, is depressed when the screen shown in FIG. 17 is displayed, a display according to FIG. 18 appears on the respective workstation screen. FIG. 18 shows a transponder menu which allows allocation of transponder elements to certain testers.

FIGS. 6 through 18 described above are given only as examples of the test system according to this invention. It is self-evident that the system according to this invention also permits a number of other screen displays to offer the tester suitable options for influencing the system.

In addition, the system may also be expanded by a remote data transfer option, thus permitting maintenance of the overall system by teleservice.

In addition, the system may easily be adapted to the specific needs of the user. This is also possible without any complicated development tool, thereby permitting on-site implementation of changes in the system. A corresponding change may of course be implemented by the above-mentioned remote data transmission. For simple adaptation of the program to customer requests, for example, changing the color of the screen and the screen display, a C library has been created, and it may also have application-specific routines, which can then be addressed through library commands in the source text.

In view of the above description it is likely that modifications and improvements will occur to those skilled in this technical field which are within the scope of this invention. Therefore, the invention is to be limited only by the spirit and scope of the appended claims and their equivalents.

What is claimed is:

1. A method of controlling a test system for motor vehicles having at least one test road for conducting corresponding vehicle tests, where at least two test sections are provided, each having at least one test station and a workstation, the method comprising the following steps:

generating an unambiguous identification number which is assigned to a current vehicle testing procedure, and to which vehicle-specific information is assigned;

forming a test data record with the identification number as a license plate, where the test data record has a predetermined number of data fields;

loading the test data record onto the workstation of the test section where the vehicle to be tested is located;

performing a vehicle-specific test cycle of a test station and compiling measured data;

transferring the measured data to the workstation and selectively filling the data fields of the test data record with measured data;

storing the test data record; and loading a new test data record onto the other workstation.

2. The method according to claim 1, wherein the test cycle of a test station is controlled by a control module assigned to the respective test station.

3. The method according to claim 1 or 2, wherein a plurality of test stations are provided each test station having associated therewith a control module, and the respective control modules of the test stations are connected electrically, optically or electromagnetically to a control node by a field bus.

4. The method according to claim 3, wherein each control node is formed by a field bus card which is electrically connected to the workstation.

5. The method according to claim 1 or 2, wherein each test station is assigned a predetermined number of data fields of the test data record.

6. The method according to claim 1 or 2, wherein a first and a second card reader are provided, with the first card reader being connected electrically to a workstation set up in an office area, and the identification number generated being stored on a card, and the second card reader being connected electrically to a workstation set up in a test section, and the identification number being read from the card, so that then the corresponding data record is loaded into the memory of this workstation.

7. The method according to claim 1 or 2, wherein a transponder system is provided, with the vehicle to be tested being assigned to a transponder element, and the transponder system allowing identification of the vehicle at the test station.

8. The method according to claim 1 or 2, and comprising the further steps of:

forming an administrative database containing the identification number, vehicle owner information, license plate information, a relational connection to a vehicle model database and a relational connection to the testing device database;

forming a system database containing the required limit values and customer-specific settings; and forming a tester database containing the name of the tester in combination with a certain transponder element; where the testing device databases contain the test information on the respective testing devices which is accessed via the identification numbers.

9. A device for controlling a test system for motor vehicles with at least one test road, for conducting appropriate vehicle tests, said device comprising:

at least two test sections each having at least one workstation and at least one test station with a control module being assigned to each test station;

a field bus which connects at least one test station to the workstation; and a control unit which carries out the following steps:

generating an unambiguous identification number which is assigned to a current vehicle testing procedure and to which vehicle-specific information is assigned;

forming a test data record with the identification number as license plate, with the test data record having a predetermined number of data fields;

loading the test data record onto the workstation of the system;

performing a vehicle-specific test cycle of a test station and compiling measured data;

transferring the measured data to the workstation and selectively filling the data fields of the test data record with the measured data;

storing the test data record; and loading a new test data record to the other workstation.

10. The device according to claim 9, wherein a plurality of workstations are provided and are linked together by a local area network.

11. The device according to claim 9 or 10, wherein the control unit is formed by a local area network server.

12. The device according to claim 9 or 10, wherein first and second card readers are provided, with the first card reader being electrically connected to a workstation set up in an office area, and the identification number generated being stored on a card, and the second card reader being electrically connected to a workstation set up in a testing section, and the identification number generated being read from the card, so that then the respective data record is loaded into the memory of this workstation.

13. The device according to claim 9 or 10, wherein a transponder system is provided, where the vehicle to be tested is assigned to the transponder element, and the transponder system allows identification of the vehicle at the test station.

* * * * *